United States Patent
Moon

(10) Patent No.: US 11,275,152 B2
(45) Date of Patent: Mar. 15, 2022

(54) APPARATUS AND METHOD FOR DETECTING MOUNTING ANGLE OF RADAR

(71) Applicant: MANDO MOBILITY SOLUTIONS CORPORATION, Gyeonggi-do (KR)

(72) Inventor: Joung-Chel Moon, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 387 days.

(21) Appl. No.: 16/594,767

(22) Filed: Oct. 7, 2019

(65) Prior Publication Data

US 2020/0110154 A1 Apr. 9, 2020

(30) Foreign Application Priority Data

Oct. 8, 2018 (KR) .................. 10-2018-0120078

(51) Int. Cl.
  *G01S 7/40* (2006.01)
  *G01S 7/497* (2006.01)
  (Continued)

(52) U.S. Cl.
  CPC .......... *G01S 7/4026* (2013.01); *G01S 7/4972* (2013.01); *B60W 40/114* (2013.01); *B60W 2520/14* (2013.01); *G01S 7/403* (2021.05); *G01S 2013/93271* (2020.01); *G01S 2013/93274* (2020.01); *G01S 2013/93275* (2020.01)

(58) Field of Classification Search
  CPC ........ B60R 2300/804; B60R 2300/105; B60R 2300/302; B60R 2300/305; B60R 2300/301; B60W 2520/14; B60W 2520/10; B60W 40/114; B60W 30/12; B60W 2420/52; G01S 13/867; G01S 13/931; G01S 2013/93271; G01S 7/403; G01S 13/878; G01S 2013/93275; G01S 7/4972; G01S 2013/93274; G01S 5/0284; G01S 7/40; G01S 7/415; G01S 7/4026; G01S 7/4091; G01S 7/4004
  See application file for complete search history.

(56) References Cited

U.S. PATENT DOCUMENTS 6,763,318 B1 * 7/2004 Winter .................... G01S 13/93 702/158
8,061,181 B2 * 11/2011 Grossman .............. G01C 21/16 73/1.75

(Continued)

FOREIGN PATENT DOCUMENTS

KR 10-2012-0094998 8/2012
KR 10-1469561 12/2014

*Primary Examiner* — Olumide Ajibade Akonai
(74) *Attorney, Agent, or Firm* — Ladas & Parry, LLP

(57) ABSTRACT

The present disclosure relates to an apparatus and a method for detecting a radar mounting angle. The present disclosure provides an apparatus for detecting the radar mounting angle that includes a controller configured to determine a vehicle driving state of the vehicle, select a moving target when the vehicle driving state of the vehicle is determined to be straight driving, store a position of the moving target and generate a moving target driving lane of the moving target based on position information on the moving target, and detect a radar mounting angle of the vehicle using the generated moving target driving lane of the moving target.

18 Claims, 10 Drawing Sheets

(51) Int. Cl.
*G01S 13/931* (2020.01)
*B60W 40/114* (2012.01)

(56) References Cited

U.S. PATENT DOCUMENTS

| | | | | |
|---|---|---|---|---|
| 8,344,940 | B2* | 1/2013 | Jeong | G01S 7/4026 |
| | | | | 342/75 |
| 10,378,890 | B2* | 8/2019 | Seo | G01B 11/275 |
| 2013/0231825 | A1* | 9/2013 | Chundrlik, Jr | G01P 3/50 |
| | | | | 701/29.1 |
| 2015/0298705 | A1* | 10/2015 | Kiyama | G06Q 40/08 |
| | | | | 702/94 |
| 2016/0272202 | A1* | 9/2016 | Inomata | B60W 30/12 |
| 2019/0012920 | A1* | 1/2019 | Tamura | B60W 30/08 |

* cited by examiner

APPARATUS AND METHOD FOR DETECTING MOUNTING ANGLE OF RADAR

CROSS REFERENCE TO RELATED APPLICATION

This application claims priority from Korean Patent Application No. 10-2018-0120078, filed on Oct. 8, 2018, which is hereby incorporated by reference for all purposes as if fully set forth herein.

BACKGROUND OF THE INVENTION

1. Field of the Invention

The present disclosure relates to an apparatus and a method for detecting a radar mounting angle and, more particularly, to an apparatus and a method for detecting a radar mounting angle that select a moving target during straight driving and detect the mounting angle of radar of a vehicle using the driving lane of the selected moving target.

2. Description of the Prior Art

As a car has become a necessity for people today, there is growing demand for technology for enhancing the convenience and safety of a car driver. Therefore, Driver-Assistance System (DAS) technology is continuously being studied and developed.

In a DAS, vehicular radar is an essential sensor for recognizing the surroundings of a vehicle. Accuracy in sensing the position of an object around a vehicle sensed by the radar has a great impact on the overall performance of the DAS.

However, since this vehicular radar is generally mounted near a bumper of the vehicle, the radar mounting angle may be changed by a minor collision during driving of the vehicle or vibrations caused by driving. When the radar mounting angle is changed, the accuracy of position information on a surrounding object sensed by the radar is reduced, which may cause malfunction in vehicle control.

SUMMARY OF THE INVENTION

With this background, an aspect of the present disclosure is to detect a radar mounting angle using the driving lane of a nearby moving object during straight driving, thereby easily determining whether angle calibration of a radar-emitted signal is necessary.

In accordance with an aspect of the present disclosure, there is provided an apparatus for detecting a radar mounting angle, the apparatus including: an image sensor configured to be disposed in a vehicle to have a view of an outside of the vehicle and to capture image data in order to identify at least one of vehicle driving information on the vehicle and information on an object existing around the vehicle; and a controller configured to include a processor configured to process the image data captured by the image sensor, wherein the controller includes: a vehicle driving state determinator configured to determine a vehicle driving state of the vehicle; a moving target selector configured to select a moving target when the vehicle driving state of the vehicle is determined to be straight driving; a moving target driving lane generator configured to store a position of the moving target and to generate a moving target driving lane of the moving target based on position information on the moving target; and a horizontal radar mounting angle detector configured to detect a radar mounting angle of the vehicle using the generated moving target driving lane of the moving target.

In accordance with another aspect of the present disclosure, there is provided a method for detecting a radar mounting angle, the method including: a vehicle driving state determination operation of determining a vehicle driving state of a vehicle; a moving target selection operation of selecting a moving target when the vehicle driving state of the vehicle is determined to be straight driving; a moving target driving lane generation operation of storing the position of the moving target and generating a moving target driving lane of the moving target based on the position of the moving target; and a horizontal radar mounting angle detection operation of detecting a radar mounting angle of the vehicle using the generated moving target driving lane of the moving target.

In accordance with still another aspect of the present disclosure, there is provided an apparatus for detecting a radar mounting angle, the apparatus including: an image sensor configured to be disposed in a vehicle to have a view of an outside of the vehicle and to capture image data in order to identify at least one of vehicle driving information on the vehicle and information on an object existing around the vehicle; a non-image sensor configured to be disposed in the vehicle to capture sensing data in order to identify at least one of the vehicle driving information on the vehicle and the information on the object existing around the vehicle; and a controller configured to include at least one processor configured to process at least one of the image data captured by the image sensor and the sensing data captured by the non-image sensor, wherein the controller includes: a vehicle driving state determinator configured to determine a vehicle driving state of the vehicle; a moving target selector configured to select a moving target when the vehicle driving state of the vehicle is determined to be straight driving; a moving target driving lane generator configured to store a position of the moving target and to generate a moving target driving lane of the moving target based on position information on the moving target; and a horizontal radar mounting angle detector configured to detect a radar mounting angle of the vehicle using the generated moving target driving lane of the moving target.

In accordance with yet another aspect of the present disclosure, there is provided an apparatus for detecting a radar mounting angle, the apparatus including: an image sensor configured to be disposed in a vehicle to have a view of an outside of the vehicle and to capture image data in order to identify at least one of vehicle driving information on the vehicle and information on an object existing around the vehicle; a non-image sensor configured to be disposed in the vehicle to capture sensing data in order to identify at least one of the vehicle driving information on the vehicle and the information on the object existing around the vehicle; and an integrated controller configured to process the image data captured by the image sensor and the sensing data captured by the non-image sensor, wherein the integrated controller determines a vehicle driving state of the vehicle, selects a moving target when the vehicle driving state of the vehicle is determined to be straight driving, stores a position of the moving target, generates a moving target driving lane of the moving target based on position information on the moving target, and detects a radar mounting angle of the vehicle using the generated moving target driving lane of the moving target.

In accordance with still another aspect of the present disclosure, there is provided a radar sensor configured to be disposed in a vehicle to have a sensing area for an outside of the vehicle and to capture sensing data, wherein the sensing data is used to determine vehicle driving information on the vehicle, to select a moving target when the vehicle driving state of the vehicle is determined to be straight driving, to store a position of the moving target, to generate a moving target driving lane of the moving target based on position information on the moving target, and to detect a radar mounting angle of the vehicle using the generated moving target driving lane of the moving target.

In accordance with yet another aspect of the present disclosure, there is provided an apparatus for detecting a radar mounting angle, the apparatus including: a non-image sensor configured to be disposed in a vehicle to capture sensing data in order to identify at least one of vehicle driving information on the vehicle and information on an object existing around the vehicle; and a controller configured to include a processor configured to process the sensing data captured by the non-image sensor, wherein the controller includes: a vehicle driving state determinator configured to determine a vehicle driving state of the vehicle; a moving target selector configured to select a moving target when the vehicle driving state of the vehicle is determined to be straight driving; a moving target driving lane generator configured to store a position of the moving target and to generate a moving target driving lane of the moving target based on position information on the moving target; and a horizontal radar mounting angle detector configured to detect a radar mounting angle of the vehicle using the generated moving target driving lane of the moving target.

As described above, according to the present disclosure, it is possible to easily determine whether angle calibration of a radar-emitted signal is necessary by detecting the mounting angle of radar of a vehicle. Accordingly, the accuracy of position information on surrounding objects of the vehicle may be improved, thereby reducing the incidence of malfunctions in vehicle control. Furthermore, since an apparatus and a method for detecting a radar mounting angle of the present disclosure use a moving object around the vehicle, it is possible to detect the mounting angle of vehicular radar even in an open area where there are few stationary structures near the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
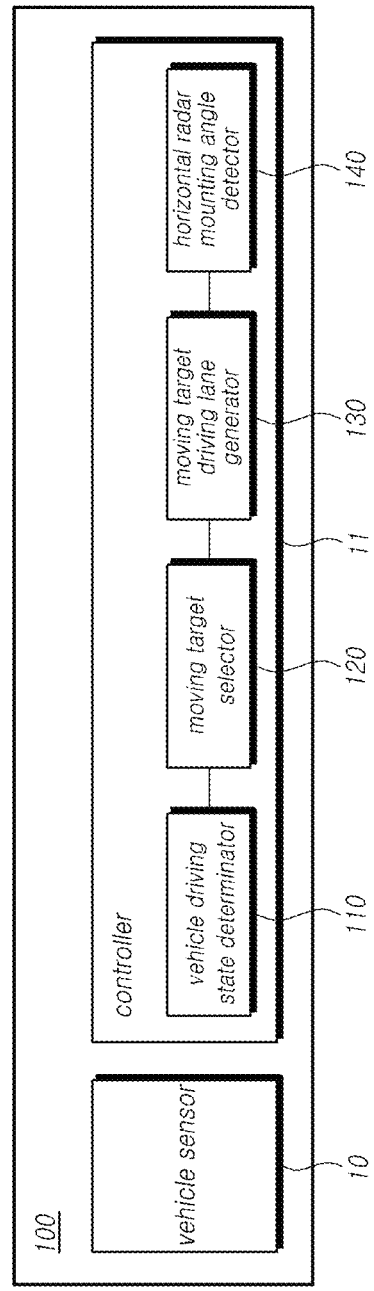
FIG. 1 illustrates the configuration of an apparatus for detecting a radar mounting angle according to one embodiment of the present disclosure.

The present disclosure discloses an apparatus and a method for detecting a radar mounting angle.

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component The apparatus for detecting the radar mounting angle according to the present disclosure may be a component that is independent of radar or may be a component integrated with radar. The vehicle disclosed in this specification may be any mobile object that moves on a road and may include an automobile, a motorcycle, and the like.

A radar sensor or radar system used in the present disclosure may include at least one radar sensor unit, for example, one or more of a front radar sensor mounted on the front of a vehicle, a rear radar sensor mounted on the rear of a vehicle, and a lateral or lateral-rear radar sensor mounted on each lateral side of a vehicle. The radar sensor or radar system may analyze a transmission signal and a reception signal to process data and may detect information about an object accordingly. To this end, the radar sensor or radar system may include an Electronic Control Unit (ECU) or processor. Data transmission or signal communication from the radar sensor to the ECU may use an appropriate communication link, such as a vehicle network bus.

The radar sensor includes one or more transmission antennas for transmitting a radar signal and one or more reception antennas for receiving a reflection signal received from an object.

The radar sensor according to an exemplary embodiment may adopt a signal transmission/reception scheme including a multi-dimensional antenna array and a Multiple-Input Multiple-Output (MIMO) scheme in order to form a virtual antenna aperture larger than an actual antenna aperture.

For example, a two-dimensional antenna array is used to achieve angular accuracy and resolution in horizontal and vertical directions. Using a two-dimensional radar antenna array, signals are individually transmitted and received by two scans (temporally multiplexed) in horizontal and vertical directions, and MIMO may be used separately from the two-dimensional horizontal and vertical radar scans (temporally multiplexed).

Specifically, according to one embodiment, the radar sensor may adopt a two-dimensional antenna array configuration that includes a transmission antenna unit including a total of 12 transmission antennas (Tx) and a reception antenna unit including 16 reception antennas (Rx), and may thus have a total of 192 virtual reception antenna arrangements.

In this case, the transmission antenna unit has three transmission antenna groups, each of which includes four transmission antennas, wherein a first transmission antenna group may be spaced apart from a second transmission antenna group by a predetermined distance in the vertical direction, and the first or second transmission antenna group may be spaced apart from a third transmission antenna group by a predetermined distance (D) in the horizontal direction.

In addition, the reception antenna unit may include four reception antenna groups, each of which includes four reception antennas. The reception antenna groups may be disposed to be spaced apart in the vertical direction, and the reception antenna unit may be disposed between the first transmission antenna group and the third transmission antenna group, which are spaced apart in the horizontal direction.

In another embodiment, antennas for the radar sensor may be disposed in a two-dimensional antenna array. In one example, each antenna patch has a rhombus arrangement, thereby reducing unnecessary side lobes.

Alternatively, the two-dimensional antenna array may include a V-shaped antenna array in which a plurality of radiation patches is disposed in a V shape. More specifically, the two-dimensional antenna array may include two V-shaped antenna arrays. Here, a single feed is made to the apex of each V-shaped antenna array.

Alternatively, the two-dimensional antenna array may include an X-shaped antenna array in which a plurality of radiation patches is disposed in an X shape. More specifically, the two-dimensional antenna array may include two X-shaped antenna arrays. Here, a single feed is made based on the center of each X-shaped antenna array.

In addition, the radar sensor according to the embodiment may use an MIMO antenna system in order to achieve sensing accuracy or resolution in the vertical and horizontal directions.

Specifically, in the MIMO system, each transmission antenna may transmit a signal having an independent waveform that is distinct from that of another signal. That is, each transmission antenna may transmit a signal having an independent waveform that is distinct from that of signals from other transmission antennas, and each reception antenna may determine from which transmission antenna a reflection signal reflected on an object was transmitted on the basis of these different waveforms of signals.

Further, in one embodiment, the radar sensor may be configured to include a radar housing for accommodating a substrate including transmission and reception antennas and a circuit, and a radome forming an appearance of the radar housing. Here, the radome may include a material capable of reducing the attenuation of transmitted and received radar signals, and may be formed as front and rear bumpers, a grille or a side body of a vehicle, or the outside surface of a vehicle component.

That is, the radome of the radar sensor may be disposed inside a vehicle grille, a bumper, a car body, or the like or may be disposed as a part of a component forming the outside of a vehicle, such as a vehicle grille, a bumper, and a car body part, thereby improving the aesthetic appearance of a vehicle and providing convenience in mounting the radar sensor.

Hereinafter, the apparatus and the method for detecting the radar mounting angle according to the present disclosure will be described in detail with reference to the drawings.

FIG. 1 illustrates the configuration of an apparatus for detecting a radar mounting angle according to one embodiment of the present disclosure.

The apparatus for detecting the radar mounting angle of the present disclosure includes a vehicle sensor 10 including at least one sensor. The at least one sensor may be disposed in a vehicle and may be configured to capture or sense at least one of vehicle driving information on the vehicle and information on an object present around the vehicle.

The vehicle sensor 10 may include an image sensor, and the image sensor may be a vehicular image sensor represented by a camera, an image system, or a vision system. The vehicular image sensor may include a front camera having a front view from the vehicle, a rear camera having a rear view from the vehicle, and a rear-lateral camera having a lateral view or rear-lateral view from the vehicle, and may selectively include one or more of these cameras oriented in a plurality of directions as necessary.

These cameras function to capture image data of the surroundings of the vehicle and to transmit the image data to a processor or a controller. The vision system or the image sensor according to the present embodiment may further include an ECU or an image processor that functions to process captured image data and to display the image data.

The vision system or the image sensor according to the present embodiment may further include an appropriate data link or communication link, such as a vehicle network bus, for data transmission or signal communication from the camera to the image processor.

The vehicle sensor 10 may include a non-image sensor, and the non-image sensor may include at least one of a radar sensor, a lidar sensor, a Time-Of-Flight (TOF) sensor, and an ultrasonic sensor.

The non-image sensor is disposed in the vehicle and performs a function of capturing sensing data in order to sense one of objects around the vehicle. Specifically, the non-image sensor refers to a sensor that transmits electromagnetic waves, such as radar waves or ultrasonic waves, and receives and analyzes a signal reflected on a target object to thereby calculate information, such as a distance to the target object and a position.

The apparatus for detecting the radar mounting angle of the present disclosure may further include a controller 11 that includes: a vehicle driving state determinator that determines a vehicle driving state of the vehicle; a moving target selector that selects a moving target when the vehicle driving state of the vehicle is determined to be straight driving; a moving target driving lane generator that stores the position of the moving target and generates a moving target driving lane of the moving target based on position information on the moving target; and a horizontal radar mounting angle detector that detects the radar mounting angle of the vehicle using the generated moving target driving lane of the moving target. The vehicle driving state determinator 110, the moving target selector 120, the moving target driving lane generator 130, and the horizontal radar mounting angle detector 140 included in the apparatus for detecting the radar mounting angle of the present disclosure may be integrated to function as a single controller, and this controller may include a processor for processing at least one of image data captured by the image sensor and sensing data captured by the non-image sensor.

In addition, the controller may identify at least one of vehicle driving information on the vehicle and information on an object existing around the vehicle partly using at least one of the image data captured by the image sensor and the sensing data captured by the non-image sensor, may determine the vehicle driving state of the vehicle to determine a moving target, and may detect a radar mounting angle using the driving lane of the moving target.

The controller or the integrated controller according to the present embodiment may be configured as a Domain Control Unit (DCU) having a function of receiving and processing information on a plurality of vehicle sensors or a function of mediating transmission and reception of sensor signals and a function of detecting a radar mounting angle according to the present embodiment in an integrated manner, but is not limited thereto.

The integrated controller (DCU) may function to: process at least one of the image data captured by the image sensor and the sensing data captured at the non-image sensor; determine the vehicle driving state of the vehicle at least partly based on processing of the image data captured by the image sensor and processing of the sensing data captured by the non-image sensor; select a moving target when the vehicle driving state of the vehicle is determined to be straight driving; store the position of the moving target; generate a moving target driving lane of the driving target based on position information on the moving target; and detect the radar mounting angle of the vehicle using the generated moving target driving lane of the moving target.

Hereinafter, the function of each component included in the controller 11 will be described. When the controller 11 is configured as an integrated controller, the integrated controller may perform the function of each component of the controller to be described below.

Referring to FIG. 1, the controller 11 of the present disclosure includes the vehicle driving state determinator 110 that determines the vehicle driving state of a vehicle. The vehicle driving state may include straight driving, driving on a curving road, and the like. The vehicle driving state determinator 110 may use the yaw rate, navigation information, the position of the vehicle at least partly based on image data or sensing data captured by the sensor 10, a surrounding stationary structure, or a moving object in order to determine the vehicle driving state. The vehicle driving state determinator 110 may receive vehicle driving information on the vehicle from the controller that controls the vehicle driving information, thereby determining the vehicle driving state. The received vehicle driving information on the vehicle may include an indication of a vehicle driving state, such as a straight driving state, a curve driving state, and the like.

In one embodiment of the present disclosure, the apparatus for detecting the radar mounting angle directly detects the yaw rate of the vehicle or receives the yaw rate detected by a yaw rate sensor. When the yaw rate of the vehicle is 0, the vehicle driving state determinator 110 determines that the vehicle driving state of the vehicle is straight driving.

The controller 11 of the present disclosure includes the moving target selector 120 that selects a moving target when it is determined that the vehicle driving state of the vehicle is straight driving. The term "moving target" refers to one moving object selected from among one or more moving objects existing in front of the vehicle. Here, the moving object is an object that is not fixed on the ground but can move at a speed. The moving target selected by the moving target selector 120 may be an automobile, a motorcycle, or a truck but is not limited thereto.

In one embodiment of the present disclosure, the moving target selector 120 receives speed information on the vehicle and speed information on one or more vehicles existing in front of the vehicle and selects a moving target based on the speed information on the vehicle and the speed information on the one or more vehicles. The speed information on the vehicle may be received from the controller that controls the vehicle driving information. The speed information on the one or more vehicles existing in front of the vehicle may be estimated by a radar system of the vehicle or may be detected by the apparatus for detecting the radar mounting angle. The radar system of the vehicle emits electromagnetic waves and analyzes electromagnetic waves reflected back from an object, thereby estimating distance and speed with respect to the object. The moving target selector 120 compares the received speed information on the vehicle with speed information on moving objects existing in front of the vehicle and selects a moving target from among the moving objects existing in front of the vehicle.

In one embodiment of the present disclosure, the moving target selector 120 calculates the speed of each of the one or more vehicles relative to the vehicle and selects the vehicle with the highest relative speed as the moving target. The moving target selector 120 compares the speed information on the vehicle with the speed information on the one or more vehicles existing in front of the vehicle and calculates the relative speed of each of the one or more vehicles existing in front of the vehicle. For example, when there are three vehicles A, B, and C in front of the vehicle, the speed of the vehicle is 80 km/h, the speed of vehicle A is 90 km/h, the speed of vehicle B is 100 km/h, and the speed of vehicle C is 80 km/h, the speed of vehicle A relative to the vehicle is 10 km/h, the speed of vehicle B relative to the vehicle is 20 km/h, and the speed of vehicle C relative to the vehicle is 0 km/h. The moving target selector 120 compares the calculated relative speeds of the respective vehicles to the vehicle and selects the vehicle having the highest relative speed to the vehicle as the moving target. In this example, the moving target selected by the moving target selector 120 is vehicle B.

In another embodiment of the present disclosure, the moving target selector 120 selects a moving target in consideration of position information and speed information on one or more vehicles existing in front of the vehicle. Specifically, the moving target selector 120 further receives position information on the one or more vehicles existing in front of the vehicle, calculates the speed of each vehicle, which is within a preset range from the vehicle, relative to the vehicle, and selects the vehicle with the highest relative speed as the moving target. The moving target selector 120 receives the position information on the one or more vehicles existing in front of the vehicle. The position information on the one or more vehicles existing in front of the vehicle may be estimated by the radar system of the vehicle or may be detected by the apparatus for detecting the radar mounting angle. In addition, the moving target selector 120 may receive position information on the vehicle. The position information on the vehicle may be received from the controller that controls the vehicle driving information. The moving target selector 120 extracts a vehicle existing within the preset range from the position of the vehicle based on the position information on the vehicles existing in front of the vehicle and the position information on the vehicle. The moving target selector 120 calculates the relative speed of each extracted vehicle within the preset range to the vehicle and selects the vehicle having the highest relative speed as the moving target. For example, in the above example, when the preset range is 50 m and vehicle A and vehicle C are within a range of 50 m from the position of the vehicle, the moving target selector 120 extracts vehicles A and C as vehicles existing within the preset range from the vehicle and calculates the speeds of vehicle A and vehicle C relative to the vehicle. In this example, since the speed of vehicle A relative to the vehicle is 10 km/h and the speed of vehicle C relative to the vehicle is 0 km/h, the moving target selector 120 selects vehicle A, having the highest speed relative to the vehicle, as the moving target.

The controller 11 of the present disclosure includes the moving target driving lane generator 130 that stores the position of a moving target partly based on at least one of the image data and the sensing data captured by the sensor 10 and generates a moving target driving lane of the moving target based on position information on the moving target. The position information on the moving target is periodically estimated or detected by the radar system of the vehicle or the apparatus for detecting the radar mounting angle and is stored. The moving target driving lane of the moving target is the centerline of a moving target trajectory calculated based on the stored position information on the moving target.

In one embodiment of the present disclosure, the moving target driving lane generator 130 stores the position of the moving target and determines whether the number of stored pieces of position information on the moving target is greater than a preset threshold value. When the number of pieces of position information on the moving target is greater than the preset threshold value, the moving target driving lane generator 130 generates a moving target driving lane of the moving target based on the position information on the moving target. The moving target driving lane generator 130 may periodically store the position of the moving target over time. The stored position of the moving target forms the movement trajectory of the moving target. The moving target driving lane generator 130 determines whether the number of stored pieces of position information on the moving target is greater than the preset threshold value. The preset threshold value is determined to be the number of pieces of position information on the moving target that is determined to be great enough to generate the moving target driving lane of the moving target in a concrete application model. When it is determined that the number of pieces of position information on the moving target is greater than the preset threshold value, the moving target driving lane generator 130 generates a moving target driving lane of the moving target based on the stored position information on the moving target. Here, the moving target driving lane is parallel to the actual driving lane of the vehicle on which the vehicle actually runs.

The controller 11 of the present disclosure includes the horizontal radar mounting angle detector 140 that detects the radar mounting angle of the vehicle using the generated moving target driving lane of the moving target. The radar mounting angle of the vehicle may be the angle of radar mounted on the front of the vehicle relative to the horizontal line of the vehicle, and the horizontal line of the vehicle is a straight line in the width direction of the vehicle. When the radar mounting angle of the vehicle is not 0, the radar mounting angle of the vehicle may be considered to be misaligned due to a collision or vibrations during vehicle driving. The radar mounting angle of the vehicle may include the angle of the centerline of an emitted signal from the radar of the vehicle relative to the driving lane of the vehicle. Here, the centerline of the emitted signal from the radar refers to a horizontal line that is the center of one or more radar-emitted signals. The driving lane of the vehicle refers to a horizontal line parallel to the moving target driving lane of the moving target.

In one embodiment of the present disclosure, the horizontal radar mounting angle detector 140 detects the radar mounting angle of the vehicle using an angle between the moving target driving lane and the centerline of the emitted signal from the radar of the vehicle. Here, the centerline of the emitted signal from the radar of the vehicle refers to a line that is the center of emitted signals from Short-Range Radar (SRR), Mid-Range Radar (MRR), and Long-Range Radar (LRR). The centerline of the signal emitted from the radar may be a normal to the direction of a signal emitted by the radar device. The horizontal radar mounting angle detector 140 may extract an angle between the moving target driving lane of the moving target generated by the moving target driving lane generator 130 and the centerline of the emitted signal from the radar of the vehicle and may determine an angle between the moving target driving lane and the centerline of the emitted signal from the radar of the vehicle as the radar mounting angle. Alternatively, the horizontal radar mounting angle detector 140 may estimate the driving lane of the vehicle that is parallel to the moving target driving lane of the moving target, may extract an angle between the driving lane of the vehicle and the centerline of the emitted signal from the radar of the vehicle, and may determine the angle as the radar mounting angle.

In another embodiment of the present disclosure, the moving target driving lane generator 130 may generate a moving target driving lane using a slope calculated by the least-squares fitting formula based on stored position information on the moving target. The stored position information on the moving target may be indicated by coordinates on a coordinate plane having the centerline of the emitted signal from the radar of the vehicle as one axis. The least-squares fitting formula is as follows.

$$\text{Least Squares Fit} = \frac{\sum_{i=1}^{n}(x_i - \bar{x})(yi - \bar{y})}{\sum_{i=1}^{n}(x_i - \bar{x})^2}$$

($\bar{x}$: mean x, $\bar{y}$: mean y)

Here, x and y denote coordinates on each axis of the stored position information on the moving target. The horizontal radar mounting angle detector 140 may detect the radar mounting angle of the vehicle between the moving target driving lane and the centerline of the emitted signal from the radar using the slope of the moving target driving lane of the moving target.

As described above, according to the apparatus for detecting the radar mounting angle of the present disclosure, when the driving state of a vehicle is straight driving, the radar mounting angle of the vehicle may be detected using a moving target having the same driving lane. Therefore, it is possible to easily determine whether angle calibration of a radar-emitted signal is necessary based on the detected radar mounting angle of the vehicle. Accordingly, the accuracy of position information on surrounding objects of the vehicle may be improved, thereby reducing malfunction in vehicle control. Furthermore, since the apparatus for detecting the radar mounting angle of the present disclosure uses a moving object around the vehicle as a moving target for detecting a radar mounting angle, the apparatus can detect the mounting angle of vehicular radar even in an open area where there are few stationary structures near the vehicle.

Figure 2:
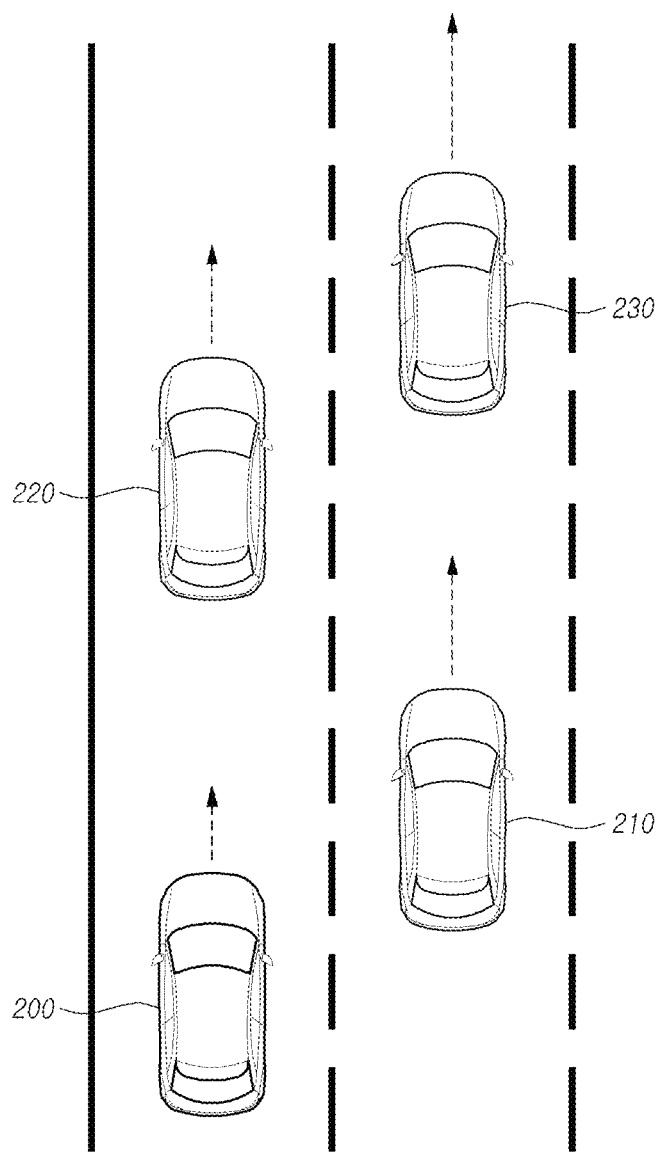
FIG. 2 illustrates a vehicle and one or more vehicles existing in front of the vehicle according to one embodiment of the present disclosure.

FIG. 2 illustrates a vehicle and one or more vehicles existing in front of the vehicle according to one embodiment of the present disclosure.

Referring to FIG. 2, there are vehicles 210, 220, and 230 in front of a vehicle 200. The vehicle driving state of the vehicle is a straight driving state, as shown in FIG. 2, and the yaw rate is 0. The driving direction of the vehicle is indicated by the direction of the arrow shown above the vehicle, and speed information on the vehicle is indicated by the length of the dotted line shown above the vehicle. The speed information on the vehicle may be received from a controller that controls vehicle driving information. Similarly to the driving direction and the speed information of the vehicle 200, the driving directions of the vehicles 210, 220, and 230 are indicated by the directions of arrows shown above the respective vehicles, and speed information on the vehicles 210, 220, and 230 is indicated by the length of dotted lines shown above the respective vehicles. As illustrated in FIG. 2, the vehicle driving states of the vehicle 200 and the vehicles 210, 220, and 230 are the straight driving state, the driving directions of the vehicles are the same, and the actual driving lanes of the vehicles are parallel. A moving target selector selects a moving target based on the speed information on the vehicle 200 and the speed information on the one or more vehicles 210, 220, and 230 existing in front of the vehicle.

Figure 3:
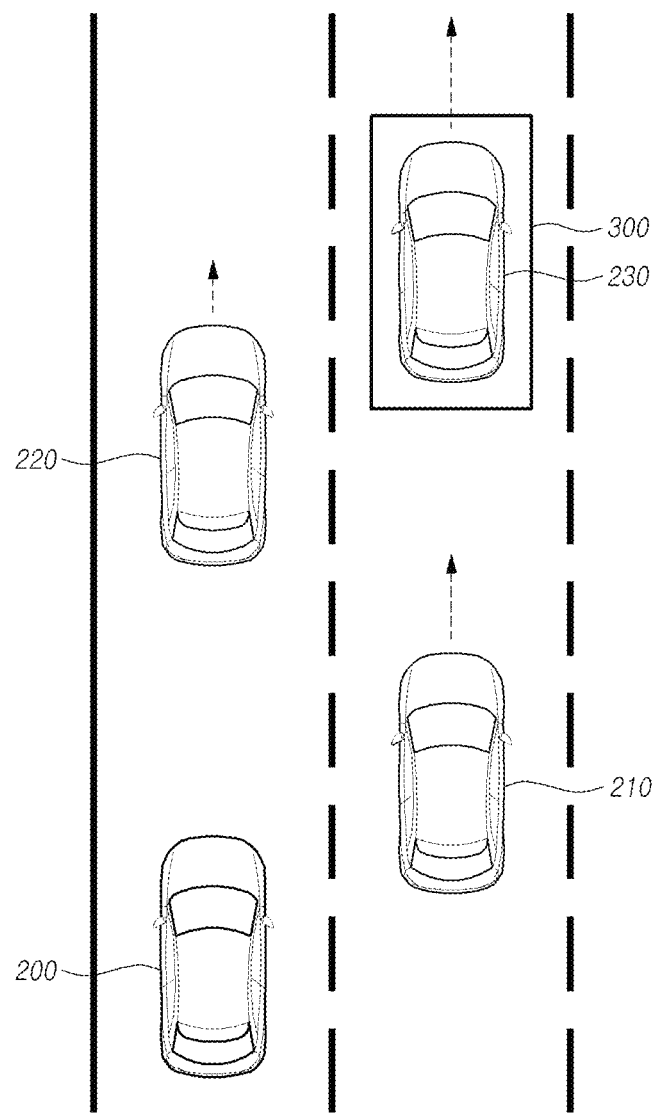
FIG. 3 illustrates a method for selecting a moving target according to one embodiment of the present disclosure.

FIG. 3 illustrates a method for selecting a moving target according to one embodiment of the present disclosure. In this embodiment, a moving target selector calculates the speed of each of one or more vehicles relative to a vehicle and selects the vehicle having the highest relative speed as a moving target. In FIG. 3, when the speed of the vehicle 200 is 70 km/h and the speeds of the vehicles 210, 220, and 230 existing in front of the vehicle are 90 km/h, 80 km/h, and 100 km/h, respectively, the speed of the vehicle 210 relative to the vehicle 200 is 20 km/h, the speed of the vehicle 220 relative to the vehicle 200 is 10 km/h, and the speed of the vehicle 230 relative to the vehicle 200 is 30 km/h. In FIG. 3, the relative speed of each vehicle to the vehicle is expressed by the length of the dotted line shown above each vehicle. The moving target selector selects the vehicle 230 as the moving target 300 based on information on the calculated relative speed of each vehicle to the vehicle.

Figure 4:
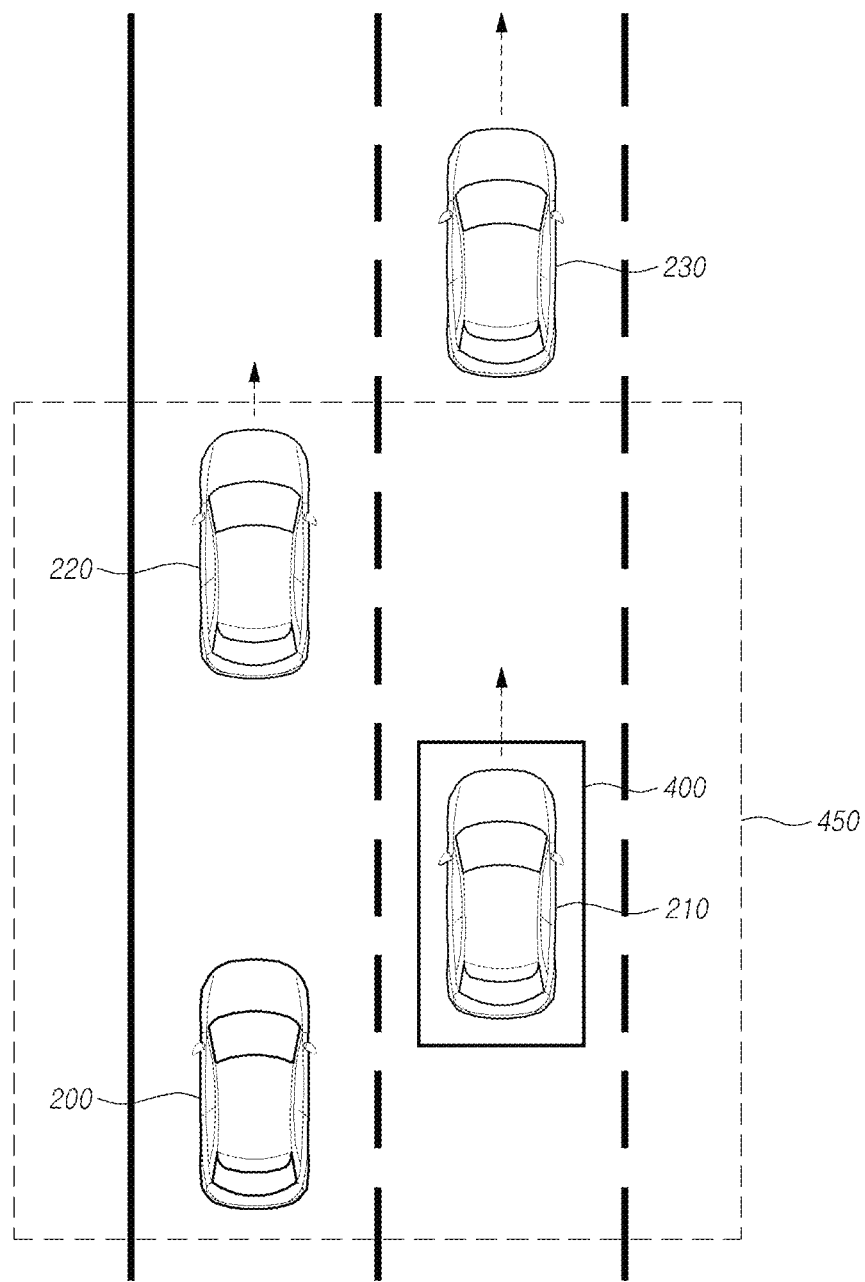
FIG. 4 illustrates a method for selecting a moving target according to another embodiment of the present disclosure.

FIG. 4 illustrates a method for selecting a moving target according to another embodiment of the present disclosure. In this embodiment, a moving target selector selects a moving target in consideration of position information and speed information on one or more vehicles existing in front of a vehicle. Specifically, the moving target selector 120 further receives position information on the one or more vehicles existing in front of the vehicle, calculates the relative speed of each vehicle, which is within a preset range from the vehicle, to the vehicle, and selects the vehicle with the highest relative speed as the moving target. This embodiment is described as follows using an example in which speed information on the vehicle 200 and the vehicles 210, 220, and 230 illustrated in FIG. 3 is available. In FIG. 4, it is assumed that the preset range is 50 m ahead from the vehicle 200. In this case, the vehicle 210 and the vehicle 220 are positioned in the preset range 450 from the vehicle 200. The relative speeds of the vehicles 210 and 220 to the vehicle 200 calculated by the moving target selector are 20 km/h and 10 km/h, respectively. Accordingly, the moving target selector selects the vehicle 210 as a moving target 400.

The values of the position information and the speed information on the vehicle 200 and the vehicle 210, 220, and 230 described above are illustrated as an example of the present disclosure, and are not limited thereto.

Figure 5:
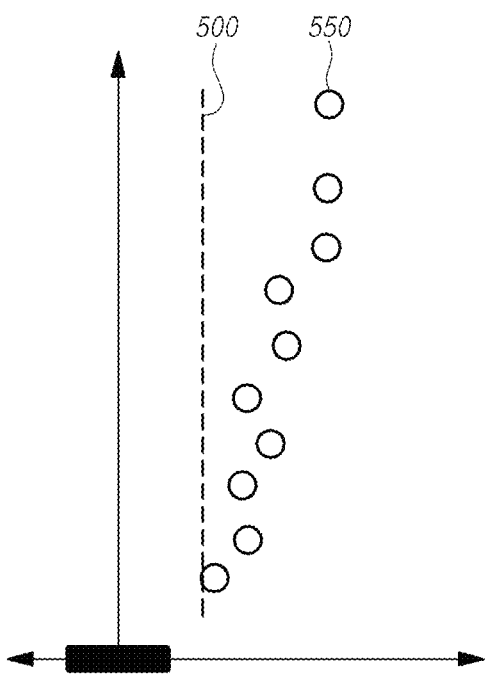
FIG. 5 illustrates the movement trajectory of a moving target according to one embodiment of the present disclosure.

FIG. 5 illustrates the movement trajectory of a moving target according to one embodiment of the present disclosure.

A moving target driving lane generator of an apparatus for detecting a radar mounting angle stores the position of a moving target. Position information on the moving target may be estimated by a radar system of a vehicle or may be periodically estimated or detected by the apparatus for detecting the radar mounting angle. The stored position of the moving target forms the movement trajectory 550 of the moving target with respect to the centerline 500 of a radar-emitted signal from the vehicle over time.

Figure 6:
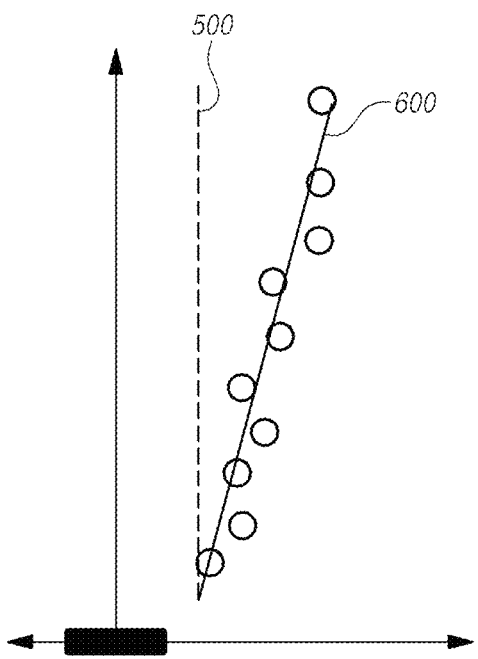
FIG. 6 illustrates the moving target driving lane of a moving target according to one embodiment of the present disclosure.

FIG. 6 illustrates the moving target driving lane of a moving target according to one embodiment of the present disclosure.

A moving target driving lane generator of an apparatus for detecting a radar mounting angle determines whether the number of stored pieces of position information on a moving target is greater than a preset threshold value. When it is determined that the number of pieces of position information on the moving target is large enough to generate the moving target driving lane of the moving target, the moving target driving lane generator generates a moving target driving lane 600 of the moving target using the stored position information on the moving target. The apparatus for detecting the radar mounting angle may generate the moving target driving lane by calculating the slope of the moving target driving lane of the moving target using the coordinates of the stored position information on the moving target and may use the least-squares fitting formula as a slope-calculating method.

Figure 7:
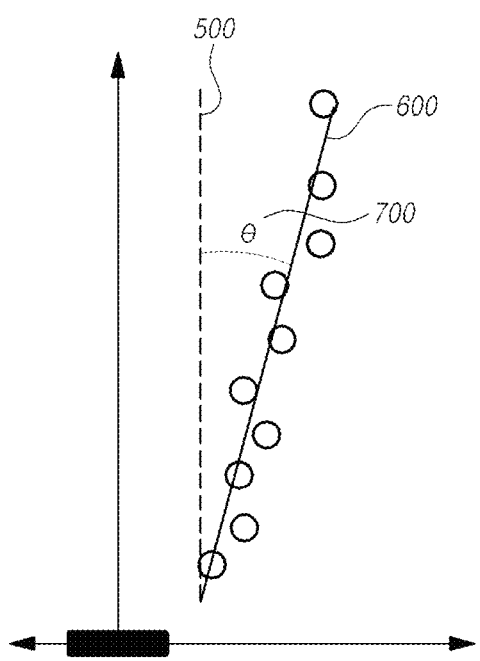
FIG. 7 illustrates an angle between the centerline of a radar-emitted signal from a vehicle and the moving target driving lane of a moving target according to one embodiment of the present disclosure.

FIG. 7 illustrates an angle between the centerline of a radar-emitted signal from a vehicle and the moving target driving lane of a moving target according to one embodiment of the present disclosure.

A horizontal radar mounting angle detector of an apparatus for detecting a radar mounting angle detects the radar mounting angle of a vehicle using the generated moving target driving lane of a moving target. In one embodiment, the horizontal radar mounting angle detector detects the radar mounting angle of the vehicle using an angle 700 between the moving target driving lane and the centerline of an emitted signal from radar of the vehicle. In another embodiment, the radar mounting angle of the vehicle is calculated from the slope of the moving target driving lane of the moving target relative to the centerline of the emitted signal from the radar of the vehicle.

Figure 8:
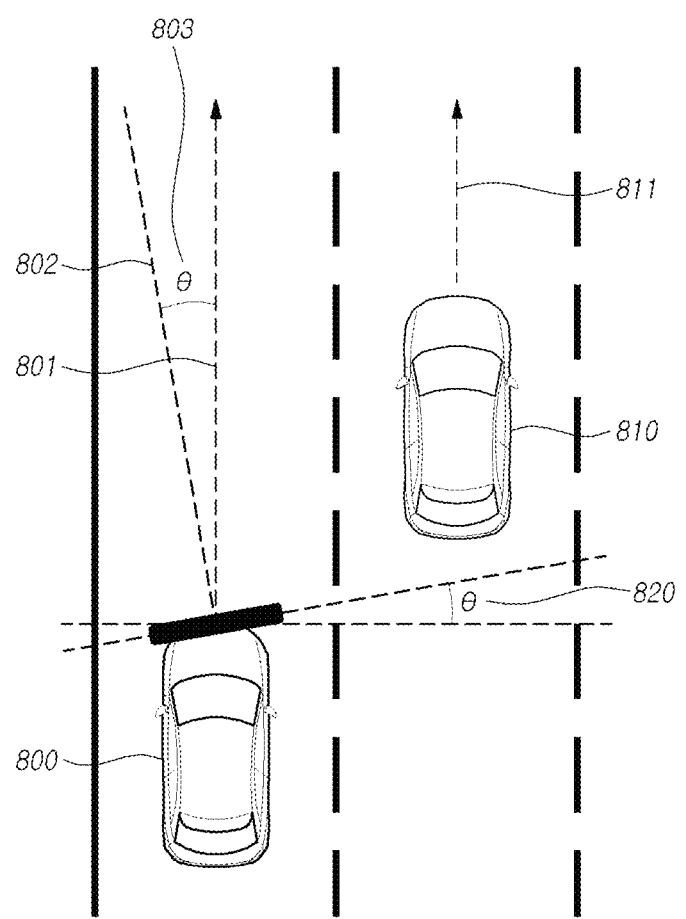
FIG. 8 illustrates the detection of the radar mounting angle of a vehicle according to one embodiment of the present disclosure.

FIG. 8 illustrates the detection of the radar mounting angle of a vehicle according to one embodiment of the present disclosure.

Referring to FIG. 8, a vehicle 800 and a moving target 810 in front of the vehicle run straight on the same straight road. Therefore, the driving direction of the vehicle 800 is the same as the driving direction of the moving target 810, and the driving lane 801 of the vehicle 800 and the driving lane 811 of the moving target 810 are parallel to each other. The driving lane 801 of the vehicle may be estimated based on the moving target driving lane 811 of the moving target generated by the moving target driving lane generator. A horizontal radar mounting angle detector may detect the radar mounting angle 820 of the vehicle using an angle between the moving target driving lane 811 and the centerline 802 of a signal emitted from the radar of the vehicle. Alternatively, the horizontal radar mounting angle detector may detect the radar mounting angle 820 of the vehicle using the angle between the driving lane 801 of the vehicle, estimated based on the moving target driving lane 811, and the centerline 802 of the signal emitted from the radar of the vehicle.

Figure 9:
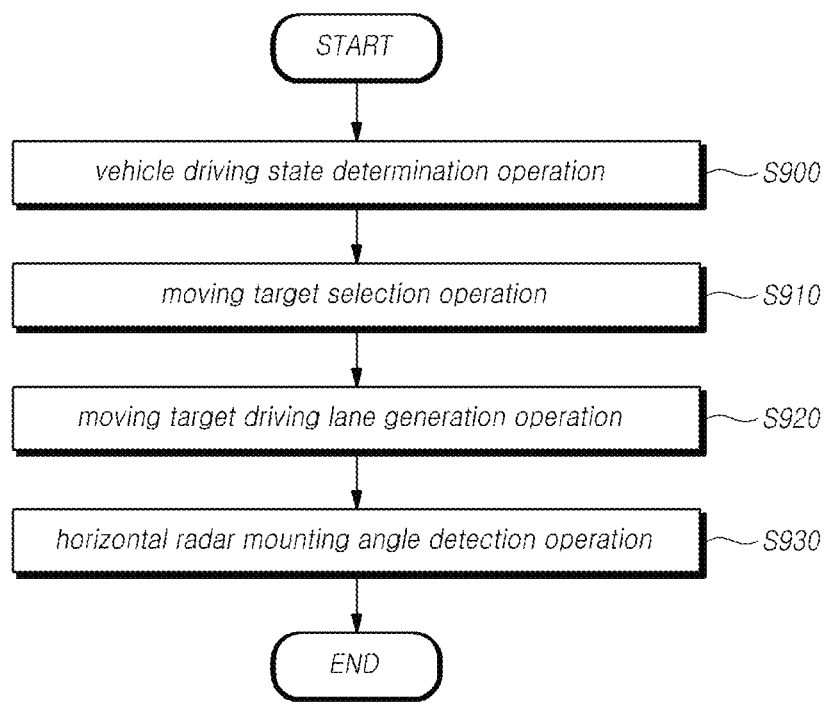
FIG. 9 illustrates a method for detecting a radar mounting angle according to one embodiment of the present disclosure.

FIG. 9 illustrates a method for detecting a radar mounting angle according to one embodiment of the present disclosure.

The method for detecting the radar mounting angle of the present disclosure includes: a vehicle driving state determination operation of determining a vehicle driving state of the vehicle; a moving target selection operation of selecting a moving target when the vehicle driving state of the vehicle is determined to be straight driving; a moving target driving lane generation operation of storing the position of the moving target and generating a moving target driving lane of the moving target based on position information on the moving target; and a horizontal radar mounting angle detection operation of detecting the radar mounting angle of the vehicle using the generated moving target driving lane of the moving target.

Referring to FIG. 9, the method for detecting the radar mounting angle of the present disclosure includes the vehicle driving state determination operation (S900) of determining the vehicle driving state of a vehicle. The vehicle driving state may include straight driving, driving on a curved road, and the like. To determine the vehicle driving state, the yaw rate, navigation information, the position of the vehicle, a surrounding stationary structure, or a moving object may be used. An apparatus for detecting a radar mounting angle may receive vehicle driving information on the vehicle from a controller that controls the vehicle driving information, thereby determining the vehicle driving state. The received vehicle driving information on the vehicle may include an indication of a vehicle driving state, such as a straight driving state, a curve driving state, and the like.

In one embodiment of the present disclosure, the apparatus for detecting the radar mounting angle directly detects the yaw rate of the vehicle or receives the yaw rate detected by a yaw rate sensor. When the yaw rate of the vehicle is 0, the apparatus for detecting the radar mounting angle determines that the vehicle driving state of the vehicle is straight driving.

The method for detecting the radar mounting angle of the present disclosure includes the moving target selection operation (S910) of selecting a moving target when it is determined that the vehicle driving state of the vehicle is straight driving. The moving target is one moving object selected from among one or more moving objects existing in front of the vehicle. Here, the moving object is an object that is not fixed on the ground but can move at a speed. The moving target selected by the apparatus for detecting the radar mounting angle may be an automobile, a motorcycle, or a truck, but is not limited thereto.

In one embodiment of the present disclosure, the apparatus for detecting the radar mounting angle receives speed information on the vehicle and speed information on one or more vehicles existing in front of the vehicle and selects a moving target based on the speed information on the vehicle and the speed information on the one or more vehicles. The speed information on the vehicle may be received from the controller that controls the vehicle driving information. The speed information on the one or more vehicles existing in front of the vehicle may be estimated by a radar system of the vehicle or may be detected by the apparatus for detecting the radar mounting angle. The radar system of the vehicle emits electromagnetic waves and analyzes electromagnetic waves reflected back from an object, thereby estimating distance and speed with respect to the object. The apparatus for detecting the radar mounting angle compares the received speed information on the vehicle with speed information on moving objects existing in front of the vehicle and selects a moving target from among the moving objects existing in front of the vehicle.

In one embodiment of the present disclosure, the apparatus for detecting the radar mounting angle calculates the speed of each of the one or more vehicles relative to the vehicle and selects the vehicle with the highest relative speed as the moving target. The apparatus for detecting the radar mounting angle compares the speed information on the vehicle with the speed information on the one or more vehicles existing in front of the vehicle and calculates the relative speed of each of the one or more vehicles existing in front of the vehicle. For example, when there are three vehicles A, B, and C in front of the vehicle, the speed of the vehicle is 80 km/h, the speed of vehicle A is 90 km/h, the speed of vehicle B is 100 km/h, and the speed of vehicle C is 80 km/h, the speed of vehicle A relative to the vehicle is 10 km/h, the speed of vehicle B relative to the vehicle is 20 km/h, and the speed of vehicle C relative to the vehicle is 0 km/h. The apparatus for detecting the radar mounting angle compares the calculated speeds of the respective vehicles relative to the vehicle and selects the vehicle having the highest speed relative to the vehicle as the moving target. In this example, the moving target selected by the apparatus for detecting the radar mounting angle is vehicle B.

In another embodiment of the present disclosure, the apparatus for detecting the radar mounting angle selects a moving target in consideration of position information and speed information on one or more vehicles existing in front of the vehicle. Specifically, the apparatus for detecting the radar mounting angle further receives position information on the one or more vehicles existing in front of the vehicle, calculates the speed of each vehicle within a preset range from the vehicle relative to the vehicle, and selects the vehicle with the relative highest speed as the moving target. The apparatus for detecting the radar mounting angle receives the position information on the one or more vehicles existing in front of the vehicle. The position information on the one or more vehicles existing in front of the vehicle may be estimated by the radar system of the vehicle, or may be detected by the apparatus for detecting the radar mounting angle. In addition, the apparatus for detecting the radar mounting angle may receive position information on the vehicle. The position information on the vehicle may be received from the controller that controls the vehicle driving information. The apparatus for detecting the radar mounting angle extracts a vehicle existing within the preset range from the position of the vehicle based on the position information on the vehicles existing in front of the vehicle and the position information on the vehicle. The apparatus for detecting the radar mounting angle calculates the speed of each extracted vehicle within the preset range relative to the vehicle and selects the vehicle having the highest relative speed as the moving target. For example, in the above example, when the preset range is 50 m and vehicle A and vehicle C are within a range of 50 m from the position of the vehicle, the apparatus for detecting the radar mounting angle extracts vehicles A and C as vehicles existing within the preset range from the vehicle and calculates the relative speeds of vehicle A and vehicle C to the vehicle. In this example, since the relative speed of vehicle A to the vehicle is 10 km/h and the relative speed of vehicle C to the vehicle is 0 km/h, the apparatus for detecting the radar mounting angle selects vehicle A having the highest relative speed to the vehicle as the moving target.

The method for detecting the radar mounting angle of the present disclosure includes the moving target driving lane generation operation (S920) of storing the position of a moving target and generating a moving target driving lane of the moving target based on position information on the moving target. The position information on the moving target is periodically estimated or detected by the radar system of the vehicle or the apparatus for detecting the radar mounting angle and is stored. The moving target driving lane of the moving target is the centerline of a moving target trajectory calculated based on the stored position information on the moving target.

In one embodiment of the present disclosure, the apparatus for detecting the radar mounting angle stores the position of the moving target and determines whether the number of stored pieces of position information on the moving target is greater than a preset threshold value. When the number of pieces of position information on the moving target is greater than the preset threshold value, the apparatus for detecting the radar mounting angle generates a moving target driving lane of the moving target based on the position information on the moving target. The apparatus for detecting the radar mounting angle may periodically store the position of the moving target over time. The stored position of the moving target forms the movement trajectory of the moving target. The apparatus for detecting the radar mounting angle determines whether the number of stored pieces of position information on the moving target is greater than the preset threshold value. The preset threshold value is the number of pieces of position information on the moving target that is determined to be great enough to generate the moving target driving lane of the moving target in a concrete application model. When it is determined that the number of pieces of position information on the moving target is greater than the preset threshold value, the apparatus for detecting the radar mounting angle generates a moving target driving lane of the moving target based on the stored position information on the moving target. Here, the moving target driving lane is parallel to the actual driving lane of the vehicle.

The method for detecting the radar mounting angle of the present disclosure includes the horizontal radar mounting angle detection operation (S930) of detecting the radar mounting angle of the vehicle using the generated moving target driving lane of the moving target. The radar mounting angle of the vehicle may be the angle of radar mounted on the front of the vehicle relative to the horizontal line of the vehicle, and the horizontal line of the vehicle is a straight line in the width direction of the vehicle. When the radar mounting angle of the vehicle is not 0, the radar mounting angle of the vehicle may be considered to be misaligned due to a collision or vibrations during vehicle driving. The radar mounting angle of the vehicle may include the angle of the centerline of an emitted signal from the radar of the vehicle relative to the driving lane of the vehicle. Here, the centerline of the emitted signal from the radar is a horizontal line that is the center of one or more radar-emitted signals. The driving lane of the vehicle is a horizontal line parallel to the moving target driving lane of the moving target.

In one embodiment of the present disclosure, the apparatus for detecting the radar mounting angle detects the radar mounting angle of the vehicle using an angle between the moving target driving lane and the centerline of the emitted signal from the radar of the vehicle. Here, the centerline of the emitted signal from the radar of the vehicle refers to a line that is the center of emitted signals from Short-Range Radar (SRR), Mid-Range Radar (MRR), and Long-Range Radar (LRR). The centerline of the emitted signal from the radar may be a normal to the direction of an emitted signal from the radar device. The apparatus for detecting the radar mounting angle may extract an angle between the generated moving target driving lane of the moving target and the centerline of the emitted signal from the radar of the vehicle and may determine an angle between the moving target driving lane and the centerline of the emitted signal from the radar of the vehicle as the radar mounting angle. Alternatively, the apparatus for detecting the radar mounting angle may estimate the driving lane of the vehicle that is parallel to the moving target driving lane of the moving target, may extract an angle between the driving lane of the vehicle and the centerline of the emitted signal from the radar of the vehicle, and may determine the angle as the radar mounting angle.

In another embodiment of the present disclosure, the apparatus for detecting the radar mounting angle may generate a moving target driving lane using a slope calculated by the least-squares fitting formula based on stored position information on the moving target. The stored position information on the moving target may be indicated as coordinates on a coordinate plane having the centerline of the emitted signal from the radar of the vehicle as one axis. The least-squares fitting formula is as follows.

$$\text{Least Squares Fit} = \frac{\sum_{i=1}^{n}(x_i - \bar{x})(y_i - \bar{y})}{\sum_{i=1}^{n}(x_i - \bar{x})^2}$$

($\bar{x}$: mean x, $\bar{y}$: mean y)

Here, x and y denote coordinates on each axis of the stored position information on the moving target. The radar mounting angle of the vehicle between the moving target driving lane and the centerline of the emitted signal from the radar may be detected using the slope of the moving target driving lane of the moving target.

As described above, according to the method for detecting the radar mounting angle of the present disclosure, when the driving state of a vehicle is straight driving, the radar mounting angle of the vehicle may be detected using a moving target having the same driving lane. Therefore, it is possible to easily determine whether angle calibration of a radar-emitted signal is necessary based on the detected radar mounting angle of the vehicle. Accordingly, the accuracy of position information on objects surrounding the vehicle may be improved, thereby reducing malfunction in vehicle control. Furthermore, since the method for detecting the radar mounting angle of the present disclosure uses a moving object around the vehicle as a moving target for detecting a radar mounting angle, the apparatus can detect the mounting angle of vehicular radar even in an open area where there are few stationary structures near the vehicle.

Figure 10:
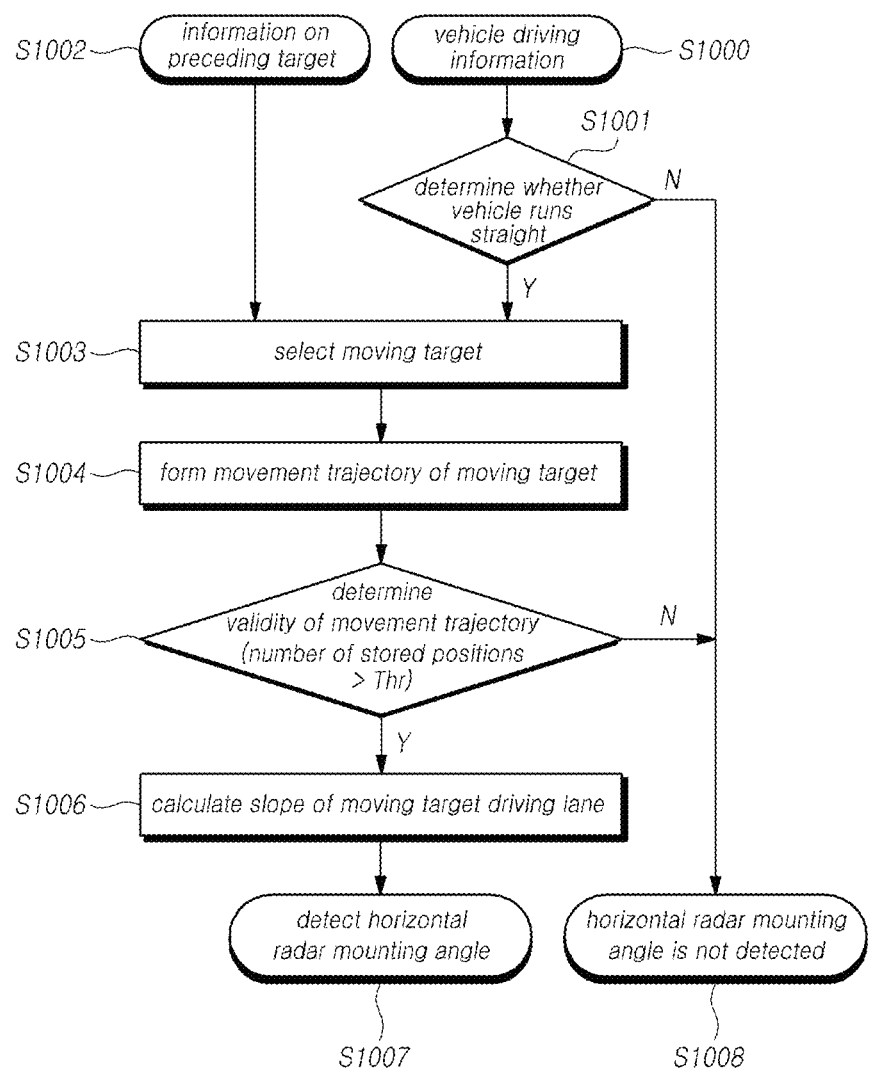
FIG. 10 illustrates a method for detecting a horizontal radar mounting angle by calculating the movement trajectory slope of a moving target according to one embodiment of the present disclosure.

FIG. 10 illustrates a method for detecting a horizontal radar mounting angle by calculating the movement trajectory slope of a moving target according to one embodiment of the present disclosure.

An apparatus for detecting a radar mounting angle obtains vehicle driving information on a vehicle (S1000). The vehicle driving information on the vehicle may be received from a controller that controls vehicle driving information. The apparatus for detecting the radar mounting angle determines whether a vehicle driving state is straight driving based on the vehicle driving information on the vehicle (S1001). The vehicle driving information on the vehicle may be an indication of a vehicle driving state, such as a straight driving state and a curve driving state, or may be information on the speed, position, and yaw rate of the vehicle. The apparatus for detecting the radar mounting angle further obtains information on a moving object in front of the vehicle (S1002). The information on the moving object in front of the vehicle may be estimated by a radar system of the vehicle or may be detected by the apparatus for detecting the radar mounting angle and includes information on the speed and position of the moving object. The apparatus for detecting the radar mounting angle selects a moving target among the moving objects in front of the vehicle (S1003). The specific process for selecting a moving target may be understood with reference to the operation of the moving target selector described above. After the moving target is selected, the apparatus for detecting the radar mounting angle forms a movement trajectory of the moving target (S1004). The movement trajectory of the moving target is formed by storing position information on the moving target. The apparatus for detecting the radar mounting angle determines the validity of the movement trajectory of the moving target (S1005). The apparatus for detecting the radar mounting angle determines that the movement trajectory is valid when the number of stored pieces of position information on the moving target is greater than a threshold value (Thr). When it is determined that the movement trajectory is valid, the apparatus for detecting the radar mounting angle calculates the slope of the moving target driving lane of the moving target (S1006). The slope of the moving target driving lane may be calculated using the least-squares fitting method. The apparatus for detecting the radar mounting angle detects a horizontal radar mounting angle using the calculated slope of the moving target driving lane (S1007). When the vehicle is not in the straight driving state or the movement trajectory of the moving target is not valid, the horizontal radar mounting angle is not detected (S1008).

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for detecting a radar mounting angle, the apparatus comprising:
   an image sensor configured to be disposed in a vehicle to have a view of an outside of the vehicle and to capture image data in order to identify at least one of vehicle driving information on the vehicle and information on an object existing around the vehicle; and
   a controller configured to comprise a processor configured to process the image data captured by the image sensor,
   wherein the controller is configured to:
   determine a vehicle driving state of the vehicle;
   select a moving target when the vehicle driving state of the vehicle is determined to be straight driving;
   store a position of the moving target and generate a moving target driving lane of the moving target based on position information on the moving target; and
   detect a radar mounting angle of the vehicle using the generated moving target driving lane of the moving target.

2. The apparatus of claim 1, wherein the controller is configured to determine that the vehicle driving state of the vehicle is straight driving when a yaw rate of the vehicle is 0.

3. The apparatus of claim 1, wherein the controller is configured to identified speed information on the vehicle and speed information on one or more objects existing in front of the vehicle and select a moving target based on the speed information on the vehicle and the speed information on the one or more objects.

4. The apparatus of claim 3, wherein the controller is configured to calculate a relative speed of each of the one or more objects to the vehicle and select an object having a highest relative speed as the moving target.

5. The apparatus of claim 3, wherein the controller is further configured to identify position information on the one or more objects existing in front of the vehicle, calculate a relative speed of each object, which is within a preset range from the vehicle, to the vehicle, and select an object having a highest relative speed as the moving target.

6. The apparatus of claim 1, wherein the controller is configured to store the position information on the moving target, determine whether a number of stored pieces of position information on the moving target is greater than a preset threshold value, and generate the moving target driving lane of the moving target based on the position information on the moving target when the number of pieces of position information on the moving target is greater than the preset threshold value.

7. The apparatus of claim 1, wherein the controller is configured to detect the radar mounting angle of the vehicle using an angle between the moving target driving lane and a centerline of a signal emitted from radar of the vehicle.

8. A method for detecting a radar mounting angle, the method comprising:
   a vehicle driving state determination operation of determining a vehicle driving state of a vehicle;
   a moving target selection operation of selecting a moving target when the vehicle driving state of the vehicle is determined to be straight driving;
   a moving target driving lane generation operation of storing a position of the moving target and generating a moving target driving lane of the moving target based on the position of the moving target; and a horizontal radar mounting angle detection operation of detecting a radar mounting angle of the vehicle using the generated moving target driving lane of the moving target.

9. The method of claim 8, wherein the vehicle driving state determination operation comprises determining that the vehicle driving state of the vehicle is straight driving when a yaw rate of the vehicle is 0.

10. The method of claim 8, wherein the moving target selection operation comprises identifying speed information on the vehicle and speed information on one or more objects existing in front of the vehicle and selecting a moving target based on the speed information on the vehicle and the speed information on the one or more objects.

11. The method of claim 10, wherein the moving target selection operation comprises calculating a relative speed of each of the one or more objects to the vehicle and selecting an object having a highest relative speed as the moving target.

12. The method of claim 10, wherein the moving target selection operation further comprises receiving position information on the one or more objects existing in front of the vehicle, calculating a relative speed of each object, which is within a preset range from the vehicle, to the vehicle, and selecting an object having a highest relative speed as the moving target.

13. The method of claim 8, wherein the moving target driving lane generation operation comprises storing the position of the moving target, determining whether a number of stored pieces of position information on the moving target is greater than a preset threshold value, and generating the moving target driving lane of the moving target based on the position information on the moving target when the number of pieces of position information on the moving target is greater than the preset threshold value.

14. The method of claim 8, wherein the horizontal radar mounting angle detection operation comprises detecting the radar mounting angle of the vehicle using an angle between the moving target driving lane and a centerline of a signal emitted from radar of the vehicle.

15. An apparatus for detecting a radar mounting angle, the apparatus comprising:

an image sensor configured to be disposed in a vehicle to have a view of an outside of the vehicle and to capture image data in order to identify at least one of vehicle driving information on the vehicle and information on an object existing around the vehicle;

a non-image sensor configured to be disposed in the vehicle to capture sensing data in order to identify at least one of the vehicle driving information on the vehicle and the information on the object existing around the vehicle; and a controller configured to comprise at least one processor configured to process at least one of the image data captured by the image sensor and the sensing data captured by the non-image sensor, wherein the controller is configured to:

determine a vehicle driving state of the vehicle;

select a moving target when the vehicle driving state of the vehicle is determined to be straight driving;

store a position of the moving target and generate a moving target driving lane of the moving target based on position information on the moving target; and detect a radar mounting angle of the vehicle using the generated moving target driving lane of the moving target.

16. The apparatus of claim 15, wherein the controller is configured to identify speed information on the vehicle and speed information on one or more objects existing in front of the vehicle and select a moving target based on the speed information on the vehicle and the speed information on the one or more objects.

17. The apparatus of claim 15, wherein the controller is configured to store the position information on the moving target, determine whether a number of stored pieces of position information on the moving target is greater than a preset threshold value, and generate the moving target driving lane of the moving target based on the position information on the moving target when the number of pieces of position information on the moving target is greater than the preset threshold value.

18. The apparatus of claim 15, wherein the controller is configured to detect the radar mounting angle of the vehicle using an angle between the moving target driving lane and a centerline of a signal emitted from radar of the vehicle.

* * * * *